(12) United States Patent
Nakamura

(10) Patent No.: US 8,171,312 B2
(45) Date of Patent: May 1, 2012

(54) RECORDING APPARATUS AND METHOD FOR CONTROLLING THE RECORDING APPARATUS

(75) Inventor: Takeshi Nakamura, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 725 days.

(21) Appl. No.: 11/770,010

(22) Filed: Jun. 28, 2007

(65) Prior Publication Data

US 2008/0010477 A1    Jan. 10, 2008

(30) Foreign Application Priority Data

Jul. 5, 2006  (JP) .................................. 2006-185681

(51) Int. Cl.
  *G06F 1/32* (2006.01)
(52) U.S. Cl. ........................................................ 713/300
(58) Field of Classification Search .................... 713/300
  See application file for complete search history.

(56) References Cited

U.S. PATENT DOCUMENTS

| | | | | |
|---|---|---|---|---|
| 5,317,707 A | * | 5/1994 | Wallace et al. ................. | 710/19 |
| 6,480,908 B1 | * | 11/2002 | Pan et al. ........................ | 710/19 |
| 7,086,583 B2 | * | 8/2006 | Wurzburg ...................... | 235/375 |
| 7,110,896 B2 | * | 9/2006 | Lamer et al. ..................... | 702/63 |
| 7,382,474 B2 | * | 6/2008 | Motosugi et al. ............ | 358/1.14 |

FOREIGN PATENT DOCUMENTS

| | | |
|---|---|---|
| JP | 2000-347762 A | 12/2000 |
| JP | 2003-110762 A | 4/2003 |
| JP | 2005111818 A | 4/2005 |
| JP | 2005131991 A | 5/2005 |
| JP | 2006018586 A | 1/2006 |
| JP | 2006-031537 A | 2/2006 |

* cited by examiner

*Primary Examiner* — Kim Huynh
*Assistant Examiner* — Eric Chang
(74) *Attorney, Agent, or Firm* — Canon U.S.A., Inc. IP Division

(57) ABSTRACT

A recording apparatus can shift to power saving modes even when the recording apparatus is connected to the host PC, thus reducing power consumption. The recording apparatus can switch to a first power saving mode to supply power that enables detection of an inquiry from a host device and also switch to a second power saving mode to supply power that enables responding to an inquiry from the host device about information as to the memory card. Prior to switching to the first power saving mode, the recording apparatus stores information about a memory card attached to the card slot in a memory unit. In response to detection of an inquiry from the host device, the recording apparatus switches from the first power saving mode to the second power saving mode, and notifies information stored in the memory card controller to the host device.

8 Claims, 7 Drawing Sheets

RECORDING APPARATUS AND METHOD FOR CONTROLLING THE RECORDING APPARATUS

BACKGROUND OF THE INVENTION

1. Field of the Invention

The present invention relates to a recording apparatus and a method for controlling the recording apparatus.

2. Description of the Related Art

In recent years, in devices that operate on supplied power, there has been strong requirement that power consumption should be reduced to decrease running cost and prevent environmental destruction.

For example, to reduce power consumption, various devices are provided with a power source control unit that includes an automatic power-off function to turn off power supply when a preset time elapses. This is intended to cut down on wasteful power consumption at night when the devices and appliances are less frequently used.

Multifunction printers (hereafter referred to as MFP) equipped with functions in addition to printing, such as a copy function and a fax function are now starting to positively comply with various energy conservation standards.

However, in order to realize high-speed operation in response to the expanding functions in most advanced printers (e.g., MFPs), the internal clock has been made faster and electric power consumption is increasing.

Many inkjet recording apparatuses are provided with a power saving mode in which if, for example, a non-operating state or a non-use state continues for a given length of time, only certain functions are allowed to operate and other functions are deactivated. Since the power saving mode is intended to reduce power consumption, it is generally configured to stop the main power supply and the main clock.

As for another configuration of power saving mode, Japanese Patent Laid-Open No. 2000-347762 discusses a power saving mode in which specific peripheral circuits operate at a lower clock frequency than in a normal operation. Japanese Patent Laid-Open No. 2003-110762 discusses a still another configuration of power saving mode in which when the power-off state of external devices connected to the recording apparatus is detected and a stand-alone function is not being executed, the normal power mode is switched to a power saving mode. Japanese Patent Laid-Open No. 2006-31537 discusses a still further configuration of power saving mode, which includes a normal power consumption mode and two power saving modes, and in which a decision is made in advance which power saving mode should be set before the normal power consumption mode is switched over to a power saving mode.

Memory devices having a card slot into which a memory card is inserted is in wide spread public use in recent years. However, in memory devices including a slot for mounting a storage function such as a memory card, there is a problem that when the recording apparatus is connected to a higher-level device (host PC), it may be impossible to switch to a power saving mode. The reason for that is that there are some operating systems (OS) in certain host PCs, which frequently issue a command to inquire about presence or absence of a memory card. Also, there are some applications which issue a command to inquire about the capacity of the card. Furthermore, in some cases, the printer driver resident in the host PC periodically makes inquiries about the status of the printer.

In response to each inquiry, it is necessary for the recording apparatus side to access the memory card, acquire necessary information, and send information to the host PC. To access the memory card, it may be required that the CPU is in a normal operation. Therefore, even after the recording apparatus has entered a power saving mode, if such an inquiry arrives, it may be necessary to immediately shift from the power saving mode to the normal power mode to respond to the inquiry. As a result of repeatedly making such transitions, power consumption increases or the life of electronic parts is shortened contrary to the saving efforts. Therefore, a transition to a power saving mode may not take place if the recording apparatus is connected to the host PC.

In Japanese Patent Laid-Open No. 2000-347762, clocks are continually supplied to specific peripheral circuits at all times. According to this configuration, even when the operation stops for a predetermined length of time, the clock cannot be stopped, and more reduction of power consumption cannot be realized. Furthermore, in Japanese Patent Laid-Open No. 2003-110762, unless the power supply to the external devices connected to the main body is turned off, the transition to a power saving mode cannot be effected.

Therefore, for example, when the printer is connected to the PC and power is supplied to the PC, the printer may not shift to the power saving mode. In the configuration shown in Japanese Patent Laid-Open No. 2006-31537, in order to shift from one power saving mode to another power saving mode, it is necessary to return once to the normal power consumption mode, which increases waste of electric power. Moreover, since it is required to decide beforehand the power saving mode that is to be entered, control of the device becomes more complex.

SUMMARY OF THE INVENTION

An embodiment of the present invention is directed to a recording apparatus and a control method of the recording apparatus, which enables a transition to a power saving mode even while the recording apparatus is connected to the host PC and can reduce power consumption without complicating the apparatus structure and the control method.

According to an aspect of the present invention, a recording apparatus having a card slot to which a memory card is capable of being detachably attached. The recording apparatus includes a switching unit configured to switch between a first power saving mode in which a CPU enables only an external interrupt and a second power saving mode in which an inquiry from a host device about information as to the memory card is responded, a detection unit configured to detect the inquiry from the host device, a memory unit configured to store information to respond to the inquiry, a memory card controller configured to write in the memory unit information indicating presence or absence of a memory card at the card slot, and a notification unit. When the inquiry from the host device is detected by the detection unit while the first power saving mode is effective, the switching unit switches the first power saving mode over to the second power saving mode and the notification unit notifies information stored in the memory unit to the host device.

According to another aspect of the present invention, a method for controlling a recording apparatus having a card slot to which a memory card is capable of being detachably attached. The recording apparatus is operable both in a first power saving mode for supplying electric power by which an inquiry from a host device can be detected and in a second power saving mode for supplying electric power in which an inquiry from the host device about the memory card can be responded. The method includes detecting an inquiry from the host device in the first power saving mode, storing information to respond to the inquiry, switching from the first power saving mode to the second power saving mode when an inquiry from the host device is detected, and notifying the stored information to the host device.

As described above, a recording apparatus according to exemplary embodiments of the present invention can shift to a power saving mode even when the recording apparatus is connected to the host PC, and power consumed by the recording apparatus can be reduced without complicating control. Above all, a recording apparatus having a plurality of devices, such as a multi-function printer, can realize the function of a device with minimum power consumption with a superb effect.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Exemplary Embodiment

Figure 1:
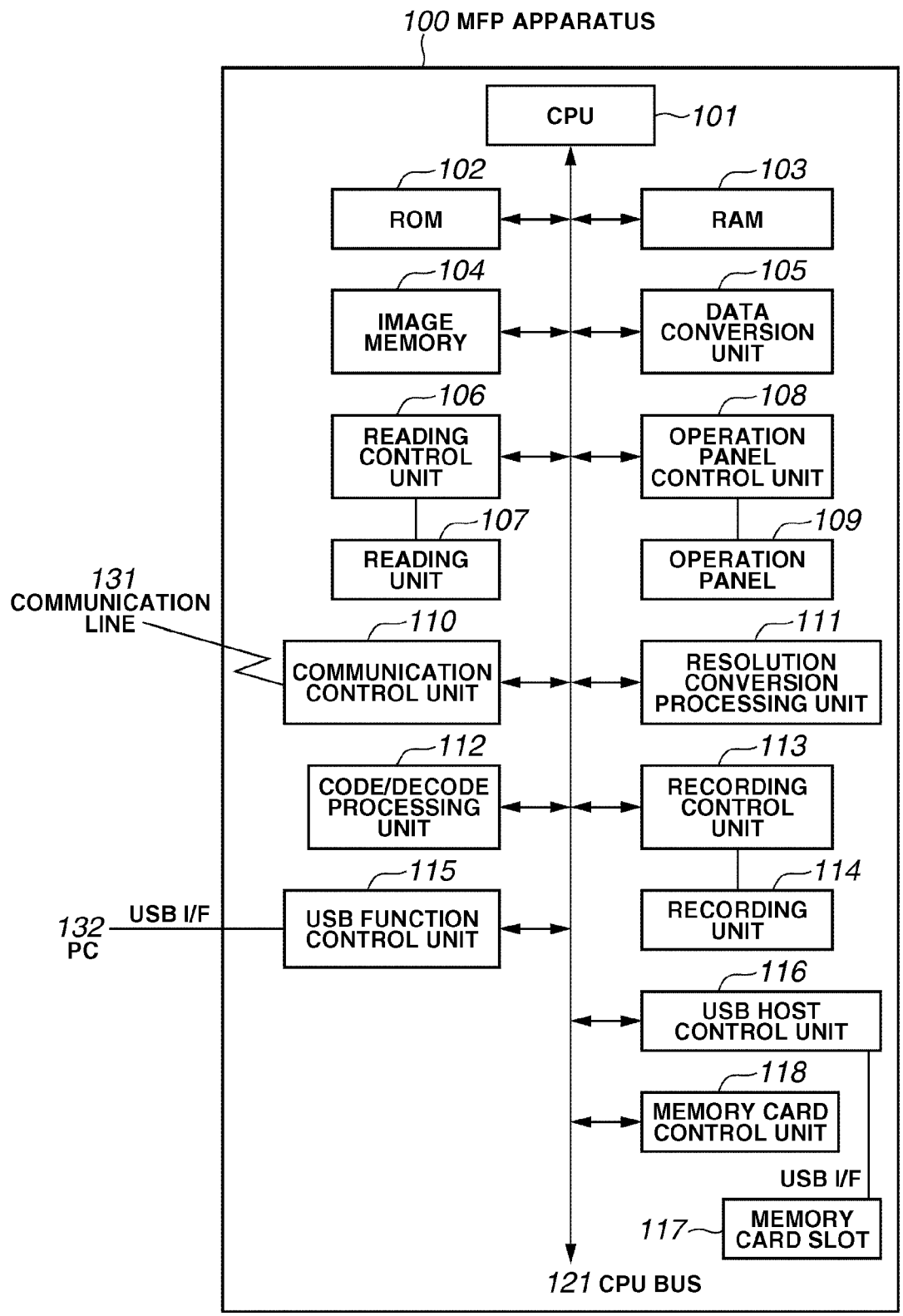
FIG. 1 is a block diagram schematically illustrating an MFP apparatus according to an embodiment of the present invention.

FIG. 1 is a block diagram schematically illustrating an MFP apparatus according to an embodiment of the present invention. In an MFP apparatus 100, a central processing unit (CPU) 101 serves as a system controller that controls the entire MFP apparatus. The CPU 101 also controls communication with a host device such as a personal computer, which is connected to the MFP apparatus 100. Furthermore, the CPU 101 detects various kinds of inquiry or command from the host device, and executes required processes. A read only memory (ROM) 102 stores control programs to be executed by the CPU 101 and an incorporate operating system (OS) program.

In an exemplary embodiment, the control programs stored in the ROM 102 perform software control for scheduling, task switching or the like under control of the incorporated OS stored in the ROM 102. A random access memory (RAM) 103 includes a static random access memory (SRAM), stores program control variables, setting values entered by an operator, and control data of the MFP apparatus 100. The RAM 103 has also a buffer area for various kind of work.

An image memory 104 includes a dynamic random access memory (DRAM) or the like, and stores image data. A data conversion unit 105 performs image-data conversion, such as analyzing a page description language (PDL) and bitmap rasterization of character data in computer graphics (CG). A reading controller 106 has a reading unit 107, which includes a CCD or a contact image sensor (CIS). The reading controller 106 optically reads an original, and converts the information into electric image data. Image data in the form of an image signal enters an image processing controller (not shown), and is subjected to various image processing such as a binarization process and a halftone process to be output as a high-definition image.

In the aforementioned exemplary embodiment, the reading controller 106 corresponds to a book reading control method in which the reading unit scans a document on the document setting area. An operation panel controller 108 displays various input operations performed by the operator and the operating condition of the MFP apparatus 100, and shows statuses such as errors and image data stored in the image memory 104. The panel controller 108 determines data as to destinations of images to be transmitted and stores setting data.

An operation panel 109 includes numeric input keys, character input keys, one-touch phone number keys, mode setting keys, confirm key, and a delete key and is configured of light emitting diodes (LEDs) and a liquid crystal display (LCD).

A communication controller 110 includes a modulator/demodulator unit (MODEM) and a network controller unit (NCU). In the aforementioned embodiment, the communication controller 110 is connected to an analog communication line (PSTN) 131, and performs communication control under T30 protocol and executes line control when a call comes in or goes out on a communication line.

A resolution conversion process unit 111 performs resolution conversion control such as mm/inch conversion of image data. The resolution conversion process unit 111 can also expand or reduce image data.

An encoding/decoding process unit 112 can encode or decode, or expand or reduce image data (of MH, MR, MMR, JBIG, JPEG, for example) handled in the MFP apparatus 100.

A recording controller 113 performs various kinds of image processing such as smoothing, record density correction, and color correction on image data to be printed, by using an image processing unit (not shown) to convert the data into image data for printing, and stores the image data in the image memory 104.

The recording controller 113 periodically extracts state information about the recording apparatus 114. The recording apparatus 114 includes an inkjet head. The recording apparatus 114 receives image data for printing, which has been converted in the recording controller 113 and stored in the image memory, and prints a color image or a monochrome image on a recording paper.

A USB function controller 115 performs communication control of the USB interface by a protocol according to USB communication standards.

More specifically, the USB function controller 115 converts data from the USB control task executed by the CPU 101 into USB packets and transmits the packets to an external information processing terminal or conversely converts USB packets input from outside into data and transmits it to the CPU 101.

In an exemplary embodiment, the MFP apparatus 100 is connected to a personal computer (hereafter referred to as PC) 132 of the host device, so that it is possible to issue a command from the PC to access a memory card, or print image data or read an image of the original from the PC.

The USB host controller 116 is a controller for communication using a protocol specified in the USB communication standard.

The USB communication standard enables two-way data communication at a high speed, and also enables connection of a plurality of hubs or functions (slaves) to one host PC (master) The USB host controller 116 functions as the host in USB communication.

A memory card slot 117 is connected through a USB interface to the USB host controller 116, and a memory card is detachable from the memory card slot 117.

A memory card controller 118 can access and read data files stored in a memory card loaded in the memory card slot 117. Furthermore, the memory card controller 118 includes a function to detect that a memory card is loaded, and in response to this detection, information about the memory card is exchanged among the aforementioned network components 101-106, 108, 110-113, 115, 116, and 118, which are interconnected on a CPU bus 121 under control by the CPU 101.

Figure 8:
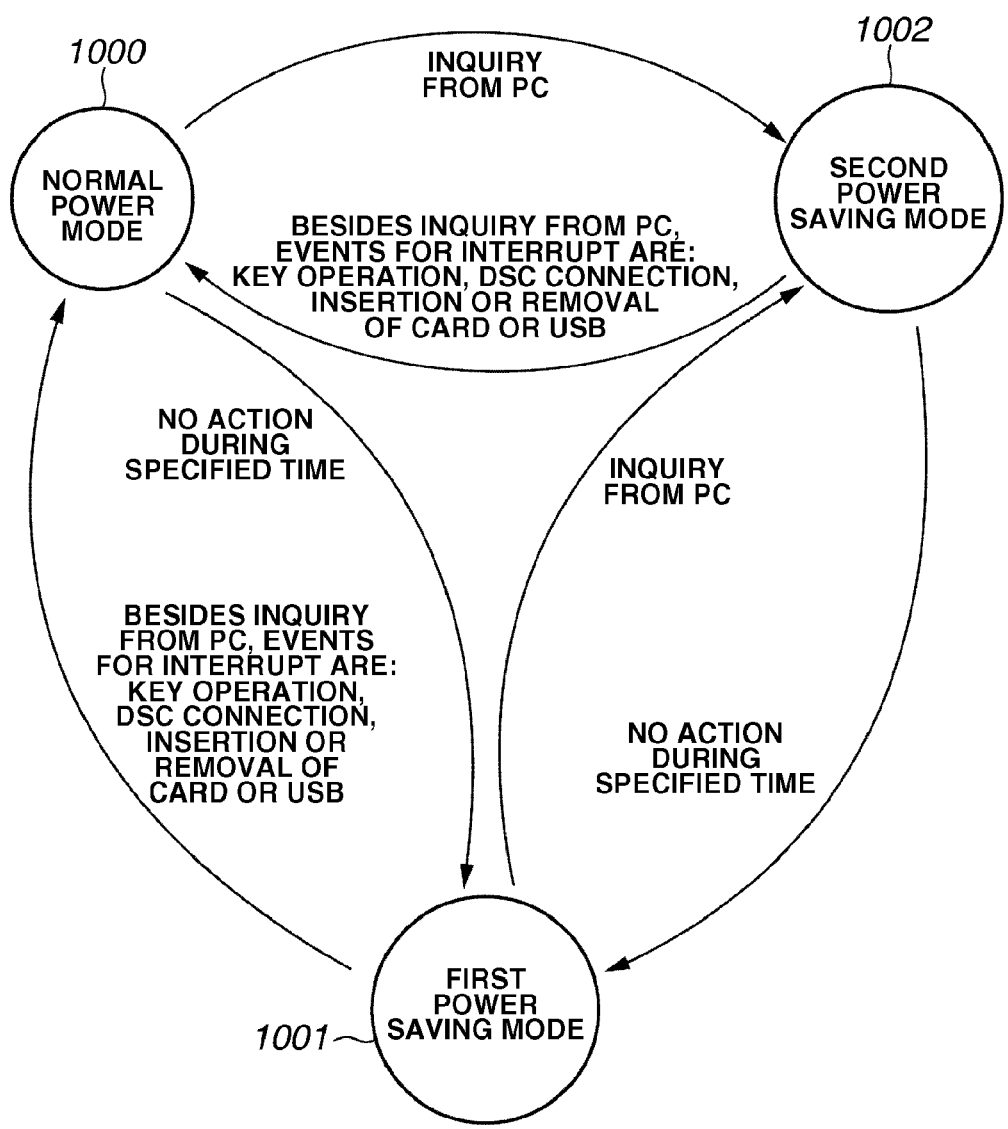
FIG. 8 is a conceptual diagram illustrating mode transitions according to an embodiment of the present invention.
Figure 9:
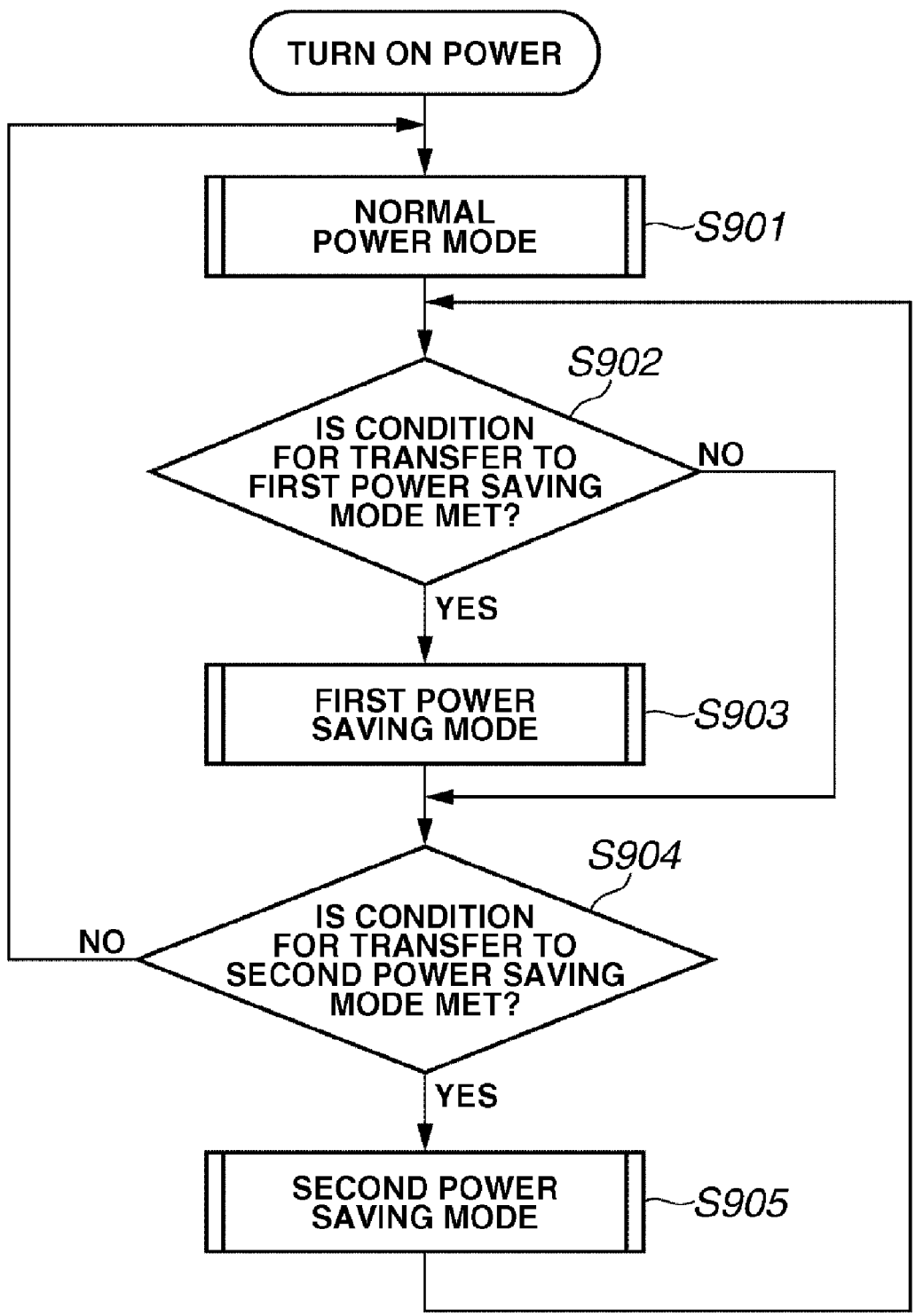
FIG. 9 is a flowchart illustrating mode transitions according to an embodiment of the present invention.

In the MFP apparatus configured as above described, mode transition operations according to an embodiment of the present invention are described with reference to FIGS. 8 and 9. FIG. 8 is a conceptual diagram illustrating the mode transition according to an embodiment of the present invention. FIG. 9 is a flowchart illustrating the mode transition according to an embodiment of the present invention. The MFP apparatus 100 can provide three power states as described below after the apparatus is powered on.

Firstly, in a normal power mode 1000, power supplied to all the aforementioned blocks is at the maximum, in which the clock is running at maximum frequency.

A recording operation, a reading operation, a panel manipulation, access to a memory card, and a communication operation are performed in the normal power mode.

Secondly, in a first power saving mode 1001, the CPU 101 is at rest, the clock signal supplied to the peripheral blocks is stopped, and the CPU 101 enables an interrupt, in other words, the CPU is operating at minimum power and clock rate to return from the first power saving mode to the other power saving mode by an external interrupt. In addition, the CPU is operating under supply of power enough to detect various inquiries sent to the MFP apparatus 100 from the host device. When the power supply is turned on, the MPF 100 in this mode consumes minimum power.

Thirdly, in a second power saving mode 1002, an inquiry command from the PC 132 can be received and responded to.

Therefore, the clock signal is supplied with minimum power and frequency that enables normally responding to the PC 132, and CPU 101 is also operating on this clock.

Since a clock frequency in a normal operation is fairly high, just decreasing of this frequency contributes to reduction of power consumption. Moreover, in the first power saving mode, it is possible to substantially reduce power consumption even while the PC 132 is connected to the MFP apparatus 100.

The inquiry commands from the PC 132 are a group of inquiries which can be answered without accessing the memory card controller 118. For example, they are commands to inquire about information such as whether there is a card at the memory card slot or about the capacity of the card.

In order to respond to such an inquiry command, when a memory card is loaded in the memory card slot 117, various items of information are stored in the RAM 103 through the memory card controller 118.

By this arrangement, when an inquiry arrives from the PC 101, it is possible to respond merely by accessing the RAM 103. Accordingly, the CPU 101 can continue operating at a low clock frequency. Through this access, information stored in the memory unit is notified to the host device.

First, when AC power (not shown) is supplied, the CPU 101 performs various kinds of initial setup on the RAM 103 using programs in the ROM 102.

Then, when the operator turns on the power from the operation panel 109, power is supplied to all component blocks, and after setting the operation clock frequency to maximum, various mechanisms (not shown) are initialized.

When the initializing operation is finished, the LEDs on the operation panel 109 are turned on, and the MFP apparatus is enabled to perform a reading operation and a printing operation, and the mode shifts to the normal power mode 1000. In FIG. 9, in step S901, the apparatus (e.g., MFP apparatus) waits for an event (e.g., inquiry, instruction, print data) from the outside (e.g., host device, operator of the MFP apparatus). Then, if no action takes place for a predetermined period of time, the LEDs on the operation panel 109 are turned off, and a massage to that effect is indicated, and the process proceeds to step S902.

In step S902, it is determined whether the conditions for a transition to the first power saving mode have been satisfied. If the conditions have been satisfied, the process moves onto step S903. If the conditions have not been satisfied, the process goes on to step S904.

In an embodiment, the conditions for making transition to the first power saving mode are that the recording controller 113, the reading controller 106, the communication controller 110, the memory card controller 118, the USB function controller 115, the USB host controller 116, and the operation panel controller 108 are not operational.

The operation panel controller 108 is not operational when a key operation is not performed for a predetermined length of time and the LEDs on the operation panel are turned off.

Needless to say, the number of those controllers varies when different types of equipment are utilized. In step S903, a sequence of transition to the first power saving mode, which will be described later, is executed, and after the transition to the first power saving mode 1001 is finished, the process waits for an interrupt event from the outside.

External interrupt events are external actions that require taking some action to the outside, such as inquiry commands from the PC 132, keystroke, insertion and removal of a memory card or USB cable, data transmission or reception. Those actions vary in number when types of equipment are different.

Subsequently, when an external interrupt event is received, a decision is made in step S904 if the condition for transition to the second power saving mode is satisfied. If the condition is satisfied, the process proceeds to step S905. If the condition is not satisfied, the process returns to the normal power mode in step S901.

The condition for making transition to the second power saving mode is that only an inquiry command from the PC 132 has been received and a response action is being made. The other conditions are the same as the conditions for the transition from the normal power mode to the first power saving mode.

In step S905, a sequence of transition to the second power saving mode, which will be described later, is executed. After the mode shifts to the second power saving mode 1002, the process waits for an external event. Subsequently, when an external event is received, the process returns to step S902 and it is possible to return to the normal power mode 1000 or the first power saving mode 1001.

Through the aforementioned sequence, power consumption can be reduced to be lower than that in the normal power mode without sacrificing the function even when the MFP apparatus is connected to the host PC.

The same effect can be obtained even if an inquiry command from the PC is a status response command from the printer driver.

Figure 2:
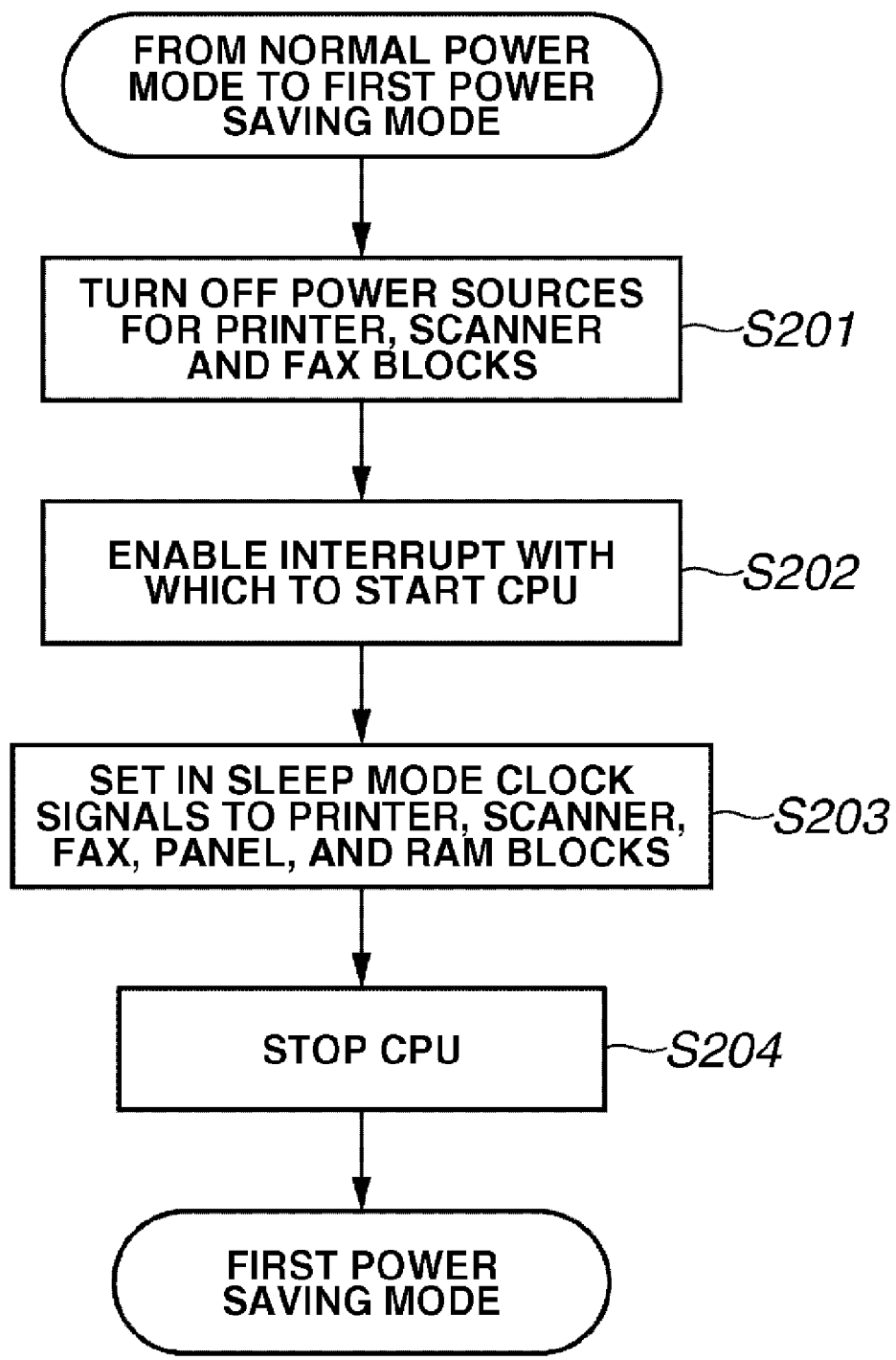
FIG. 2 is a flowchart illustrating a sequence of transition from a normal power mode to a first power saving mode according to an embodiment of the present invention.

Next, a sequence of transition from the normal power mode to the first power saving mode according to the exemplary embodiment of the present invention is described with reference to FIG. 2. FIG. 2 is a flowchart illustrating a sequence of transition from the normal power mode to the first power saving mode according to an embodiment of the present invention.

First, in step S201, the power supply to the recording controller 113, the reading controller 106, and the communication controller 110 is turned off. In step S202, an external interrupt that allows the CPU 101 to return from the stop state is enabled. This interrupt acts as an event.

Then, in step S203, the clock signals supplied to the recording controller 113, the reading controller 106, the communication controller 110, the resolution conversion process unit 111, the USB function controller 115, the operation panel controller 108, the RAM 103, and the image memory 104 are set to a sleep state.

In step S204, by suspending the CPU 101, the transition to the first power saving mode 1001 is completed. Thus, when the operation stops for a predetermined length of time, the clock signals can also be stopped and therefore, power consumption can be reduced.

Figure 3:
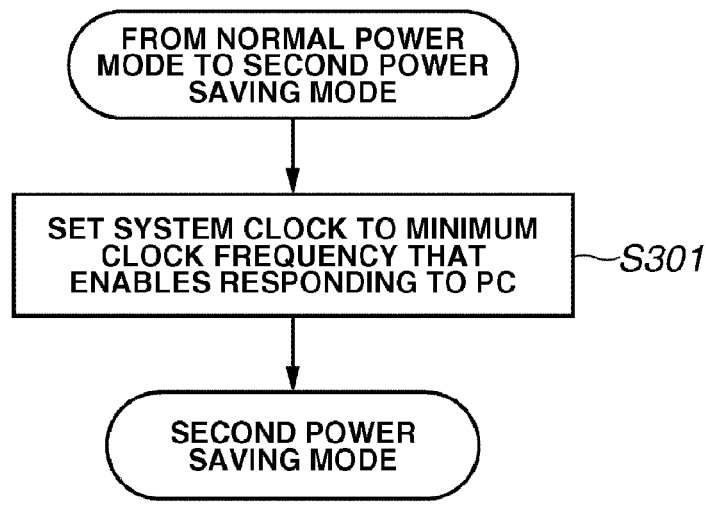
FIG. 3 is a flowchart illustrating a sequence of transition from the normal power mode to a second power saving mode according to an embodiment of the present invention.

Next, a sequence of transition from the normal power mode to the second power saving mode according to the exemplary embodiment of the present invention is described with reference to FIG. 3. FIG. 3 is a flowchart illustrating a sequence of transition from the normal power mode to a second power saving mode according to an embodiment of the present invention.

In an embodiment, to transition from the normal power mode to the second power saving mode, a clock signal is changed to a minimum frequency in step S301 that enables normally responding to the PC 132.

Since power is supplied to the respective blocks under this condition, the return from the second power saving mode to the normal power mode can be achieved more quickly than that from the first power saving mode to the normal power mode.

Next, a sequence of transition from the first power saving mode to the second power saving mode according to an embodiment of the present invention is described with reference to FIG. 4.

Figure 4:
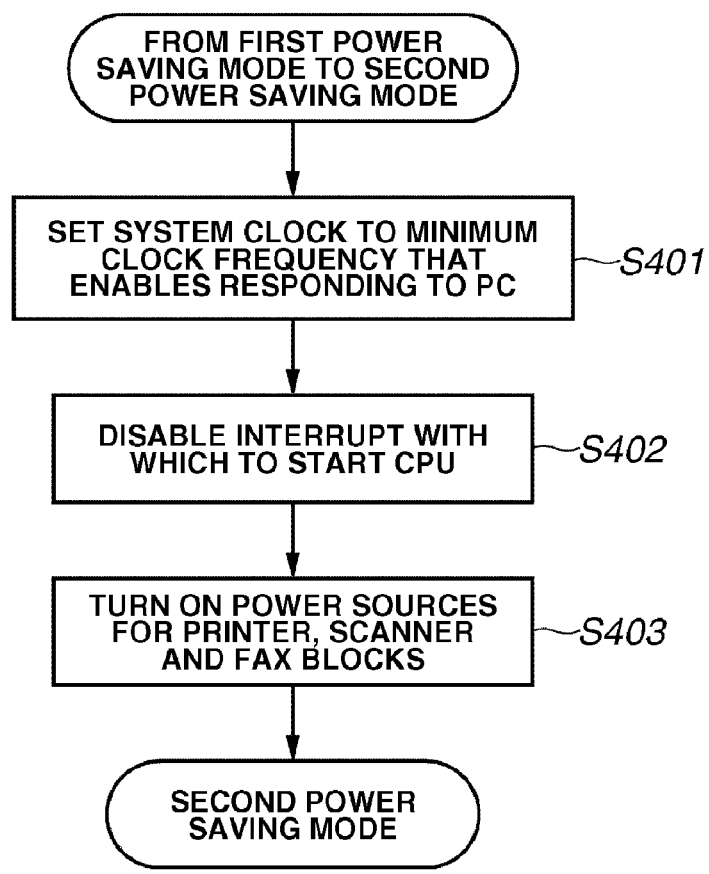
FIG. 4 is a flowchart illustrating a sequence of transition from the first power saving mode to the second power saving mode according to an embodiment of the present invention.

FIG. 4 is a flowchart illustrating a sequence of transition from the first power saving mode to the second power saving mode according to an embodiment of the present invention. When the CPU 101 detects an inquiry (command) from the host device about information as to a card memory as an external interrupt, the clock signal is changed to a minimum frequency in step S401 that enables normally responding to the PC 132. Next, in step S402, an external interrupt that brings the CPU 101 back from a suspended state, which has been enabled in advance, is disabled. In step S403, the power supply to the recording controller 113, the reading controller 106, and the communication controller 110, which has been turned off in the first power saving mode by the CPU 101, is turned on, and the transition to the second power saving mode 1002 is completed.

In an embodiment of the present invention, a response process to an inquiry from the host device is executed without accessing a memory card. Therefore, when, for example, a memory card is loaded, information is read out in advance and stored in the RAM 103 by the memory card controller. In this second power saving mode, the RAM 103 is accessed and the stored information is notified to the host device.

In this sequence, it is not necessary that the power supply once shifts to the normal power mode and therefore, power consumption is reduced compared with the case where the power supply needs to be switched to the normal power mode before responding to an inquiry. Moreover, it is not necessary to decide a power saving mode to which the power supply should be switched to, so that control is simplified.

Figure 5:
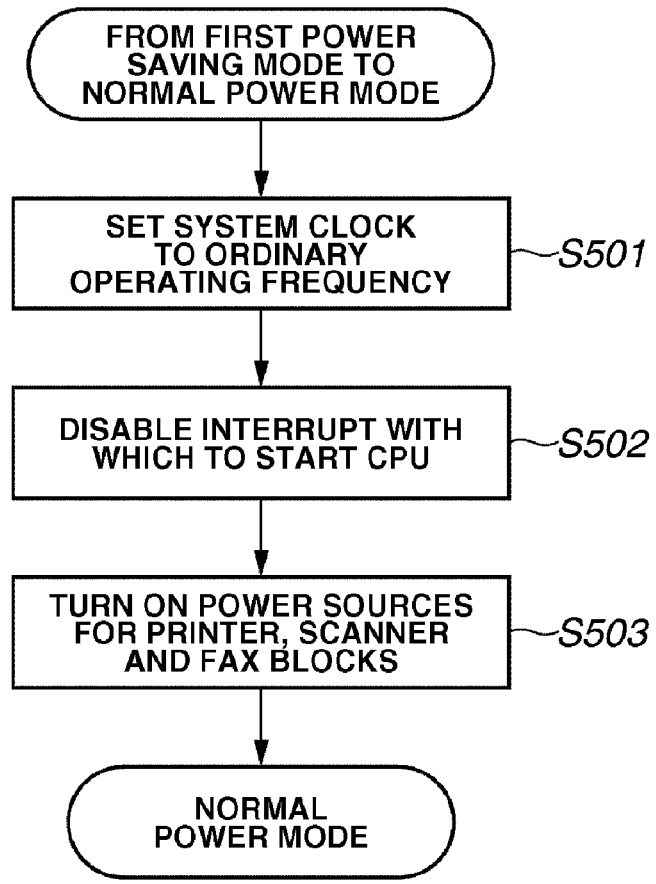
FIG. 5 is a flowchart illustrating a sequence of transition from the first power saving mode to the normal power mode according to an embodiment of the present invention.

Next, a sequence of transition from the first power saving mode to the normal power mode according to an embodiment of the present invention is described with reference to FIG. 5. FIG. 5 is a flowchart illustrating a sequence of transition from the first power saving mode to the normal power mode according to an embodiment of the present invention. In step S501, the clock signal is changed to a maximum frequency for a normal operation. In next step S502, an external interrupt that brings the CPU 101 back from the suspended state, which has been enabled in advance, is disabled. In next step S503, the power supply to the recording controller 113, the reading controller 106, and the communication controller 110, which has been turned off in the first power saving mode 1001, is turned on, and the transition to the normal power mode 1000 is completed.

Figure 6:
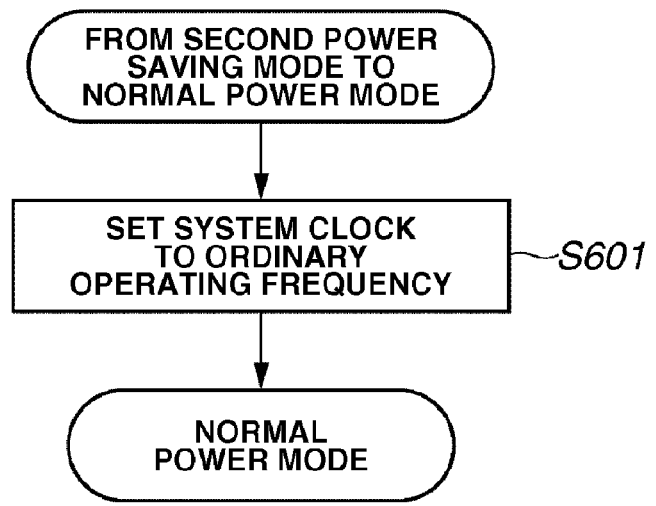
FIG. 6 is a flowchart illustrating a sequence of transition from the second power saving mode to the normal power mode according to an embodiment of the present invention.

Next, a sequence of transition from the second power saving mode to the normal power mode according an embodiment of the present invention is described with reference to FIG. 6. FIG. 6 is a flowchart illustrating a sequence of transition from the second power saving mode to the normal power mode according to an embodiment of the present invention. In step S601, the clock signal is changed to a maximum frequency for a normal operation, and the transition to the normal power mode 1000 is completed.

Figure 7:
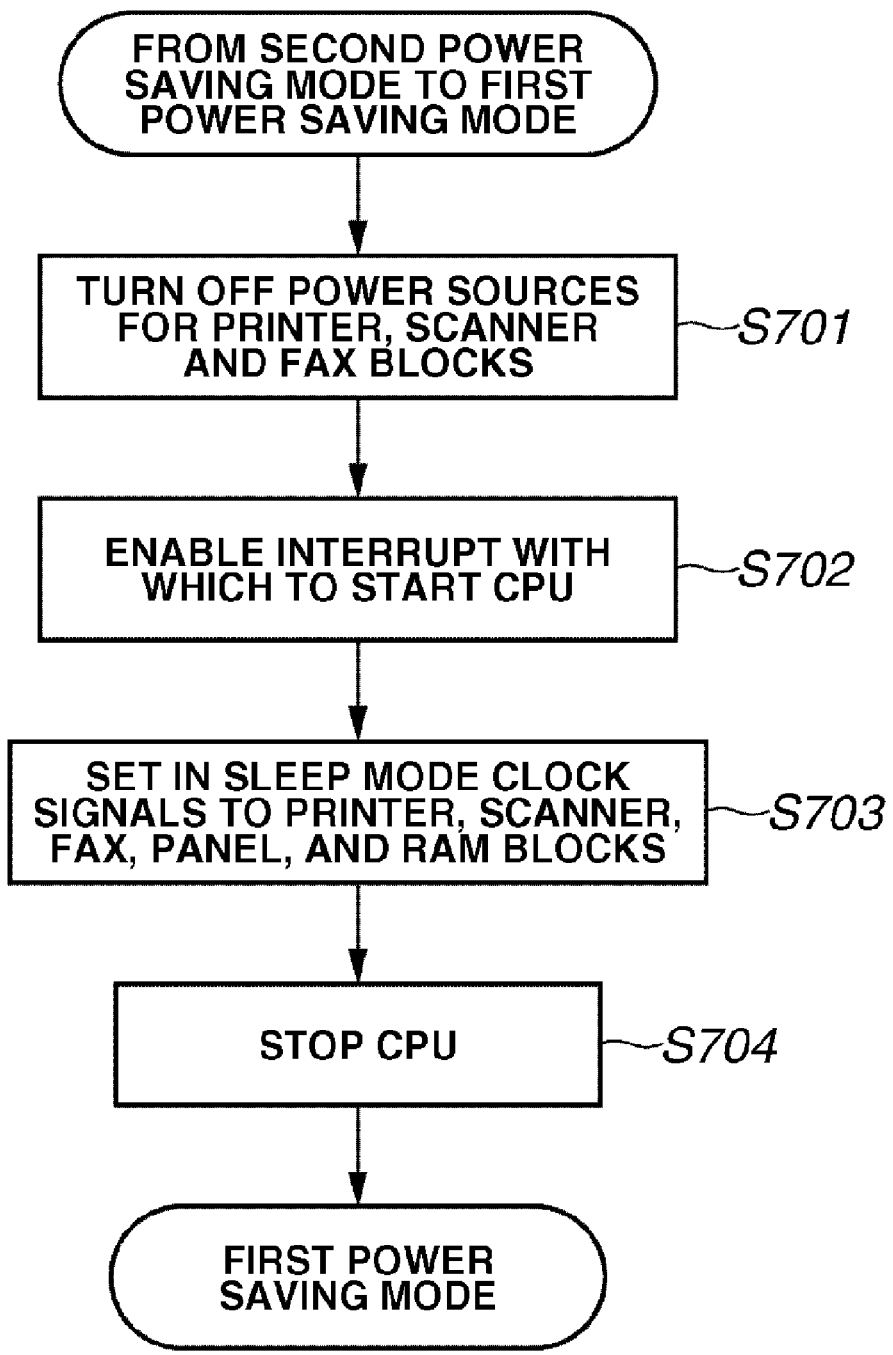
FIG. 7 is a flowchart illustrating a sequence of transition from the second power saving mode to the first power saving mode according to an embodiment of the present invention.

Next, a sequence of transition from the second power saving mode to the first power saving mode according to an embodiment of the present invention is described with reference to FIG. 7. FIG. 7 is a flowchart illustrating a sequence of transition from the second power saving mode to the first power saving mode according to an embodiment of the present invention. In step S701, the power supply to the recording controller 113, the reading controller 106, and the communication controller 110 is turned off. In step S702, an external interrupt that brings the CPU 101 back from the suspended state, is enabled. In step S703, the clock signals supplied to the recording controller 113, the recording controller 106, the communication controller 110, the resolution conversion process unit 111, the USB function controller 115, the operation panel controller 108, the RAM 103, and the image memory 104 are set to a sleep state. In step S704, the CPU 101 is suspended, and the transition to the first power saving mode 1001 is completed.

This sequence enables transition to the first power saving mode also when the host PC is cut off or inquiries stop coming in the second power saving mode, so that power consumption can be reduced.

The features of the present invention can be achieved by supplying a system or an apparatus with a storage medium having recorded thereon a software program for realizing the functions in the exemplary embodiment, and by reading and executing supplied program code.

In this case, the program code read from the storage medium in itself embodies the functions of the aforementioned exemplary embodiment, and the storage medium storing the program constitutes the present invention.

Furthermore, the scope of the present invention encompass a case where the computer executes the read-out program code, and, for example, an operating system (OS) running on the computer performs part of or all of the actual processes, and by those processes, the aforementioned functions are realized.

Moreover, in a case where the program code is written into a memory in a function expansion card or a function expansion unit, the functions of the aforementioned embodiment can be realized by commands of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-185681 filed Jul. 5, 2006, which is hereby incorporated by reference herein in its entirety.

What is claimed is:

1. An apparatus to which a removable memory medium is capable of being coupled, the apparatus controlled by using a CPU, the apparatus comprising:
    a switching unit configured to switch between a first power saving mode in which the apparatus is unable to respond to an inquiry about the removable memory medium from an external device by causing the CPU to shift to a stop state, a second power saving mode in which the apparatus is able to respond to the inquiry about the removable memory medium by causing the CPU to return to an operation state but is unable to access the removable memory medium, consumed power in the second power saving mode being larger than in the first power saving mode and a normal power mode in which the apparatus is able to access the removable memory medium, consumed power in the normal power mode being larger than in the second power saving mode;
    a detection unit configured to detect the inquiry from the external device;
    a memory unit configured to store information to respond to the inquiry before the inquiry is detected and the switching unit switches to the second power saving mode, wherein the memory unit keeps storing the information to respond to the inquiry even if the CPU is in the stop state; and
    a notification unit, when the inquiry from the external device is detected by the detection unit while the first power saving mode is effective, to cause the switching unit to switch the first power saving mode to the second power saving mode, and to notify the information stored in the memory unit to the external device as the response to the inquiry without switching to the normal power mode by the switching unit.

2. The apparatus according to claim 1, wherein the memory unit stores information about the removable memory medium when the removable memory medium is coupled and removed.

3. The apparatus according to claim 1, wherein the switching unit, when no inquiry is received from the external device in a predetermined period in the second power saving mode, switches from the second power saving mode to the first power saving mode.

4. The apparatus according to claim 1, wherein the switching unit, when an external interrupt arrives other than inquiries from the external device in the second power saving mode, switches from the second power saving mode to the normal power mode.

5. The apparatus according to claim 1, wherein the memory unit stores the information as to the presence or absence of the removable memory medium prior to switching to the first power saving mode.

6. A method for controlling an apparatus to which a removable memory medium is capable of being coupled, the apparatus controlled by using a CPU, the apparatus being operable both in a power saving mode for saving consumed power and a normal power mode, consumed power being larger in the normal power mode than in the power saving mode, the method comprising:
    detecting an inquiry from the external device as to information about the removable memory medium;
    switching from a first power saving mode in which the apparatus is unable to respond to an inquiry about the removable memory medium from an external device by causing the CPU to shift to a stop state to a second power saving mode in which the apparatus is able to respond to the inquiry about the removable memory medium by causing the CPU to return to an operation state but is unable to access the removable memory medium when the inquiry from the external device is detected;
    storing information to respond to the inquiry to a memory before the detecting the inquiry and the switching from the first power saving mode to the second power saving mode, wherein the memory keeps storing the information to respond to the inquiry even if the CPU is in the stop state; and
    notifying the stored information to the external device as the response to the inquiry without switching to the normal power mode.

7. The method according to claim 6, wherein in the second power saving mode, when no inquiry is received from the external device in a predetermined period, the second power saving mode shifts to the first power saving mode.

8. The method according to claim 6, wherein in the second power saving mode, when an external interrupt arrives other than inquiries from the external device, the second power saving mode shifts to the normal power mode.

* * * * *